United States Patent
Zhang et al.

(10) Patent No.: US 8,712,415 B2
(45) Date of Patent: Apr. 29, 2014

(54) TIMING AND CELL SPECIFIC SYSTEM INFORMATION HANDLING FOR HANDOVER IN EVOLVED UTRA

(75) Inventors: Guodong Zhang, Syosset, NY (US); Jin Wang, Central Islip, NY (US); Peter S. Wang, East Setauket, NY (US); Stephen E. Terry, Northport, NY (US)

(73) Assignee: Interdigital Patent Holdings, Inc., Wilmington, DE (US)

( * ) Notice: Subject to any disclaimer, the term of this patent is extended or adjusted under 35 U.S.C. 154(b) by 328 days.

(21) Appl. No.: 12/405,752

(22) Filed: Mar. 17, 2009

(65) Prior Publication Data

US 2009/0239539 A1 Sep. 24, 2009

Related U.S. Application Data (60) Provisional application No. 61/038,234, filed on Mar. 20, 2008.

(51) Int. Cl.
*H04W 36/00* (2009.01)

(52) U.S. Cl.
USPC ............ 455/436; 455/422.1; 455/432.1; 455/434; 455/435.1; 455/437; 455/438; 455/439; 455/442; 455/443; 455/444; 370/310.2; 370/322; 370/329; 370/331; 370/332; 370/333; 370/334

(58) Field of Classification Search
USPC ........ 455/422.1, 432.1, 435.1, 434, 436–444, 455/455; 370/310.2, 322, 329–329, 370/331–334
See application file for complete search history.

(56) References Cited

U.S. PATENT DOCUMENTS

| | | | |
|---|---|---|---|
| 5,872,774 A | 2/1999 | Wheatley, III et al. | |
| 7,003,303 B2 * | 2/2006 | Khawand et al. | 455/452.1 |
| 7,525,941 B2 * | 4/2009 | Islam et al. | 370/335 |
| 7,852,805 B2 * | 12/2010 | Kahtava et al. | 370/329 |
| 8,331,326 B2 | 12/2012 | Wang et al. | |
| 2004/0082356 A1 | 4/2004 | Walton et al. | |
| 2004/0170179 A1 | 9/2004 | Johansson et al. | |
| 2004/0174845 A1 | 9/2004 | Koo et al. | |
| 2004/0185853 A1 | 9/2004 | Kim et al. | |
| 2004/0192320 A1 | 9/2004 | Khawand et al. | |
| 2005/0094600 A1 | 5/2005 | Zhang et al. | |
| 2005/0282549 A1 | 12/2005 | Kim et al. | |
| 2007/0047493 A1 | 3/2007 | Park et al. | |
| 2008/0227453 A1 | 9/2008 | Somasundaram et al. | |
| 2008/0232304 A1 | 9/2008 | Mooney et al. | |

(Continued)

FOREIGN PATENT DOCUMENTS

| | | | |
|---|---|---|---|
| CN | 1984452 A | 6/2007 | |
| CN | 101069448 A | 11/2007 | |

(Continued)

OTHER PUBLICATIONS

ETSI TS 136 300 (V8.0.0) Mar. 2007, p. 50 only.*

(Continued)

*Primary Examiner* — Steve D Agosta
(74) *Attorney, Agent, or Firm* — Condo Roccia Koptiw LLP (57) ABSTRACT

A method and apparatus for reducing handover time includes a wireless transmit receive unit receiving cell specific information in a downlink signal. The downlink signal is one of a set of signals included in a handover process.

12 Claims, 5 Drawing Sheets

(56) References Cited

U.S. PATENT DOCUMENTS

| | | | |
|---|---|---|---|
| 2008/0242292 | A1 | 10/2008 | Koskela et al. |
| 2008/0254800 | A1 | 10/2008 | Chun et al. |
| 2008/0267131 | A1 | 10/2008 | Kangude et al. |
| 2008/0285539 | A1 | 11/2008 | Tiedemann, Jr. et al. |
| 2009/0086676 | A1 | 4/2009 | Meylan et al. |
| 2009/0129335 | A1 | 5/2009 | Lee et al. |
| 2009/0168728 | A1 | 7/2009 | Pani et al. |
| 2009/0238141 | A1 | 9/2009 | Damnjanovic et al. |
| 2009/0239539 | A1 | 9/2009 | Zhang et al. |
| 2009/0247161 | A1 | 10/2009 | Pani et al. |
| 2009/0274086 | A1 | 11/2009 | Petrovic et al. |
| 2009/0309921 | A1 | 12/2009 | Ohyama et al. |
| 2010/0027466 | A1 | 2/2010 | Mustapha |
| 2010/0113033 | A1 | 5/2010 | Qiu et al. |
| 2010/0182974 | A1 | 7/2010 | Barraclough et al. |
| 2010/0202402 | A1 | 8/2010 | Dalsgaard et al. |
| 2010/0210255 | A1 | 8/2010 | Amirijoo et al. |
| 2010/0238799 | A1 | 9/2010 | Sebire |
| 2010/0279695 | A1 | 11/2010 | Amirijoo et al. |
| 2013/0064224 | A1 | 3/2013 | Wang et al. |

FOREIGN PATENT DOCUMENTS

| | | |
|---|---|---|
| EP | 0568212 B1 | 9/1997 |
| EP | 1058471 A2 | 12/2000 |
| EP | 1117269 A1 | 7/2001 |
| EP | 1199904 A1 | 4/2002 |
| EP | 1408658 A2 | 4/2004 |
| EP | 1799003 A1 | 6/2007 |
| EP | 1909523 A1 | 4/2008 |
| IL | 194081 | 6/2009 |
| JP | 10023501 A | 1/1998 |
| JP | 2006-504335 A | 2/2006 |
| JP | 2009-519636 A | 5/2009 |
| JP | 2010023501 A | 2/2010 |
| RU | 2003122285 A | 2/2005 |
| RU | 2292669 C2 | 1/2007 |
| RU | 2305900 C2 | 9/2007 |
| WO | 01/72081 | 9/2001 |
| WO | WO 03/043237 A1 | 5/2003 |
| WO | WO 2004/079948 A1 | 9/2004 |
| WO | WO 2004/080102 A1 | 9/2004 |
| WO | WO 2005/122704 A2 | 12/2005 |
| WO | WO 2007/038994 A2 | 4/2007 |
| WO | WO 2007/066882 A1 | 6/2007 |
| WO | WO 2007/068304 A1 | 6/2007 |
| WO | WO 2007/108959 A1 | 9/2007 |
| WO | WO 2007/144760 A2 | 12/2007 |
| WO | WO 2008/023927 A2 | 2/2008 |
| WO | WO 2008/040447 A1 | 4/2008 |
| WO | WO 2010/002692 A1 | 1/2010 |

OTHER PUBLICATIONS

Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331 V8.1.0 (Mar. 2008).

Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331 V8.4.0 (Dec. 2008).

LG Electronics, "Need to obtain the target SFN prior to HO," 3GPP TSG-RAN#59bis WG 2 LTE, R2-074312 (Oct. 8-12, 2007).

RAN WG2, "LS on LTE latency analysis," 3GPP TSG RAN WG1 Meeting #49bis, R1-072648, Orlando, Florida (Jun. 25-29, 2007).

Samsung, "Neighbouring cell information," 3GPP TSG-RAN WG2 Meeting #56bis, R2-070167 (Jan. 15-19, 2007).

QUALCOMM Europe, "Delivery of HO Command," 3GPP TSG-RAN WG 2 meeting #59-bis, R2-073992 (Oct. 8-12, 2007).

IPWireless, "Contention-free Intra-LTE handover," 3GPP TSG RAN WG2 #57, R2-070646 (Feb. 12-16, 2007).

3rd Generation Partnership Project (3GPP), TS 36.300 V8.4.0, "3rd Generation Partnership Project; Technical Specification Group Radio Access Network; Evolved Universal Terrestrial Radio Access (E-UTRA) and Evolved Universal Terrestrial Radio Access network (E-UTRAN); Overall Description; Stage 2 (Release 8)", Mar. 2008, 126 pages.

3rd Generation Partnership Project (3GPP), R2-082948, "SIB reading after handover", Panasonic, 3GPP TSG RAN WG2 RRC Ad Hoc, Sophia Antipolis, France, Jun. 5-6, 2008, 4 pages.

European Telecommunications Standards Institute (ETSI), TS 136 300 V8.4.0, "Evolved Universal Terrestrial Radio Access (E-UTRA) and Evolved Universal Terrestrial Radio Access network (E-UTRAN); Overall Description; Stage 2 (3GPP TS 36.300 Version 8.4.0 Release 8)", Apr. 2008, 5 pages.

3rd Generation Partnership Project (3GPP), R2-061199, "Discussion on eNode B Change Procedure", QUALCOMM Europe, 3GPP TSG-RAN WG2 Meeting #53, Shanghai, China, May 8-12, 2006, 7 pages.

3rd Generation Partnership Project (3GPP), R1-060773, "Text Proposal of Prioritizing Non-synchroaized Random Access in E-UTRA uplink," ITRI, 3GPP TSG-RAN WG1 Meeting #44bis, Athens, Greece, Mar. 27-31, 2006, 6 pages.

3rd Generation Partnership Project (3GPP), R2-060078, "Handover procedure for LTE_ACTIVE UEs", Samsung, 3GPP TSG-RAN WG 2 #50 meeting, Sophia-Antipolis, France, Jan. 9-13, 2006, 9 pages.

3rd Generation Partnership Project (3GPP), R2-060095, "Real-time services bandover support within E-UTRAN," Huawei , 3GPP TSG-RAN WG2 Meeting #50, Sophia-Antipolis, France, Jan. 9-13, 2006, 4 pages.

3rd Generation Partnership Project (3GPP), R2-061135, "Intra-LTE Handover operation," Nokia, NTT DoCoMo, 3GPP TSG-RAN WG2 Meeting #53, Shanghai, PRC, May 8-13, 2006, 3 pages.

3rd Generation Partnership Project (3GPP), R2-061928, "RRC Re-establishment Procedure", NTT DoCoMo, 3GPP TSG-RAN WG2 Ad-hoc on LTE, Cannes, France, Jun. 27-30, 2006, 6 pages.

3rd Generation Partnership Project (3GPP), R2-082903, "Change Request for3GPP TS 36.331 V8.1.0 (Mar. 2008)", 3GPP TSG-RAN2 Meeting #62, Kansas City, U.S.A., May 5-9, 2008, 177 pages.

3rd Generation Partnership Project (3GPP), R3-060009, "The Handover Procedure for the LTE_ACTIVE Mobility," Panasonic, 3GPP TSG-RAN WG3 Meeting #50, Sophia Antipolis, France, Jan. 10-12, 2006, 4 pages.

3rd Generation Partnership Project (3GPP), TR 25.912 V0.1.7, "3rd Generation Partnership Project; Technical Specification Group Radio Access Network; Feasibility Study for Evolved UTRA and UTRAN (Release 7)", Jun. 2006, 64 pages.

3rd Generation Partnership Project (3GPP), TR 25.912 V7.1.0, "3rd Generation Partnership Project, Technical Specification Group Radio Access Network; Feasibility study for evolved Universal Terrestrial Radio Access (UTRA) and Universal Terrestrial Radio Access Netwwork (UTRAN) (Release 7)", Sep. 2006, 57 pages.

3rd Generation Partnership Project (3GPP), TS 36.300 V8.5.0, "3rd Generation Partnership Project (3GPP); Technical Specification Group Radio Access Network; Evolved Universal Terrestrial Radio Access (E-UTRA) and Evolved Universal Terrestrial Radio Access network E-UTRAN); Overall Description; Stage 2 (Release 8)", May 2008, 134 pages.

3rd Generation Partnership Project (3GPP), TS 36.300 V8.9.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", Jun. 2009, 159 pages.

3rd Generation Partnership Project (3GPP), TS 36.300 V9.0.0, "3rd Generation Partnership Project (3GPP); Technical Specification Group Radio Access Network; Evolved Universal Terrestrial Radio Access (E-UTRA) and Evolved Universal Terrestrial Radio Access network (E-UTRAN); Overall Description; Stage 2 (Release 9)", Jun. 2009, 157 pages.

3rd Generation Partnership Project (3GPP), TS 36.300, V8.0.0, "3rd Generation Partnership Project; Technical Specification Group Radio Access Network; Evolved Universal Terrestrial Radio Access (56) References Cited

OTHER PUBLICATIONS (E-UTRA) and Evolved Universal Terrestrial Radio Access network (E-UTRAN); Overall Description; Stage 2 (Release 8)", Mar. 2007, 82 pages.
3rd Generation Partnership Project (3GPP), TS 36.331 V8.2.0, "3rd Generation Partnership Project; Technical Specification Group Radio Access Network; Evolved Universal Terrestrial Radio Access (E-UTRA) Radio Resource Control (RCC); Protocol Specification (Release 8)", May 2008, 151 pages.
3rd Generation Partnership Project (3GPP); TR 25.912 V0.1.4, "3rd Generation Partnership Project; Technical Specification Group Radio Access Network; Feasibility Study for Evolved UTRA and UTRAN (Release 7)", May 2006, 38 pages.
3rd Generation Partnership Project (3GPP); TR 25.912 V0.2.0, "3rd Generation Partnership Project; Technical Specification Group Radio Access Network; Feasibility Study for Evolved UTRA and UTRAN (Release 7)", Jun. 2006, 57 pages.
3rd Generation Partnership Project (3GPP); TS 25.331 V8.0.0, 3rd Generation Partnership Project; "Technical Specification Group Radio Access Network; Radio Resource Control (RRC); Protocol Specification (Release 1999)," Sep. 2007, 1458 pages.
3rd Generation Partnership Project (3GPP); TS 36.300 V8.8.0, "3rd Generation Partnership Project (3GPP); Technical Specification Group Radio Access Network; Evolved Universal Terrestrial Radio Access (E-UTRA) and Evolved Universal Terrestrial Radio Access Network (E-UTRAN) (Release 8)", Mar. 2009, 157 pages.
3rd Generation Partnership Project (3GPP); TS 36.331 V8.6.0, "3rd Generation Partnership Project (3GPP); Technical Specification Group Radio Access Network; Evolved Universal Terrestrial Radio Access (E-UTRA) Radio Resource Control (RRC) (Release 8)", Jun. 2009, 207 pages.
3rd Generation Partnership Project, TS 36.331 V8.5.0, "3rd Generation Partnership Project; Technical Specification Group Radio Access Network; Evolved Universal Terrestrial Radio Access (E-UTRA) Radio Resource Control (RRC); Protocol Specification (Release 8)", Mar. 2009, 204 pages.
Koodli et al., "A Context Transfer Protocol for Seamless Mobility", Draft-koodli-seamoby-ct-04.txt, Seamoby Working Group, Internet Draft, Aug. 30, 2002, 35 pages.
3rd Generation Partnership Project (3GPP), R2-052787, "Channels for Random Access", CATT, 3GPP TSG RAN WG2 Meeting #49, Seoul, South Korea, Nov. 7-11, 2005, 2 pages.
3rd Generation Partnership Project (3GPP), R2-060821, "RACH Message Structure", Nokia, Joint 3GPP TSG-RAN WG1 & WG2 Meeting on LTE, Athens, Greece, Mar. 27-31, 2006, 2 pages.
3rd Generation Partnership Project (3GPP), R2-062809, "Non-Contention Based Handover Procedure on RACH Channel," ZTE, TSG-RAN Working Group 2 Meeting Seoul, Korea, Oct. 9-13, 2006, 4 pages.
3rd Generation Partnership Project (3GPP), R2-071229, "Radio Link Failure and Context Recovery", Nokia, 3GPP TSG-RAN WG2 Meeting #57bis, St. Julian's, Malta, Mar. 26-30, 2007, 3 pages.
3rd Generation Partnership Project (3GPP), R2-071359, "Radio Link Failure", Ericsson, 3GPP TSG-RAN WG2 #57bis, St. Julian, Malta, Mar. 26-30, 2007, 4 pages.
3rd Generation Partnership Project (3GPP), R2-072193, "LS on LTE Latency Analysis", 3GPP TSG-RAN WG2 Meeting #58, Kobe, Japan, May 7-11, 2007, 12 pages.
3rd Generation Partnership Project (3GPP), TS 25.331 V6.7.0, "Technical Specification Group Radio Access Network, Radio Resource Control (RRC), Protocol Specification (Release 6)", Sep. 2005, 1-1166.
3rd Generation Partnership Project (3GPP), TS 25.331 V6.9.0, "Technical Specification Group Radio Access Network, Radio Resource Control (RRC), Protocol Specification (Release 6)", Mar. 2006, 1-1209.
3rd Generation Partnership Project (3GPP), TS 25.331 V8.0.0, "Technical Specification Group Radio Access Network, Radio Resource Control (RRC), Protocol Specification (Release 8)", Jan. 2008, 455-461.

* cited by examiner

TIMING AND CELL SPECIFIC SYSTEM INFORMATION HANDLING FOR HANDOVER IN EVOLVED UTRA

CROSS REFERENCE TO RELATED APPLICATION

This application claims the benefit of U.S. provisional application No. 61/038,234 filed Mar. 20, 2008 which is incorporated by reference as if fully set forth.

FIELD OF INVENTION

This application is related to wireless communications.

BACKGROUND

The Third Generation Partnership Project (3GPP) has initiated the Long Term Evolution (LTE) program to bring new technology, new network architectures, new configurations and new applications and services to wireless networks in order to provide improved spectral efficiency and faster user experiences.

A wireless transmit receive unit (WTRU) may not continually communicate with a single eNodeB (eNB) in a cell. When a WTRU moves from communicating with a first cell to a second cell, the process of switching between the two cells is known as "handover". In an LTE network, a WTRU should be able to experience handover between a source eNB, which is an eNB in the cell that the WTRU is switching from, and a target eNB, which is an eNB in the cell that the WTRU is switching to, with little or no effect on performance of the communication link.

In some phase of the handover process in an LTE network, a WTRU must obtain information about the target eNB in order for handover to occur smoothly. One way for the WTRU to obtain information about the target eNB is for the WTRU to read a broadcast channel (BCH), which is a common downlink control channel that carries information about the eNB that is transmitting the BCH. The information may be on the primary broadcast channel (P-BCH) or the dedicated broadcast channel (D-BCH). More specifically, a master information block (MIB) that includes particular information related to the target eNB is transmitted on the P-BCH. Multiple system information blocks (SIBS) that include other information, are transmitted on the D-BCH. A WTRU may need to use a significant amount of time to read these downlink channels, due to a relatively long transmission time interval (TTI) assigned to each channel.

In a Third Generation Partnership Project (3GPP) Long Term Evolution (LTE) synchronous network, a wireless transmit receive unit (WTRU) may handover to a target cell without reading the primary broadcast channel (P-BCH) to obtain the system frame number (SFN) before it transmits a dedicated preamble in the target cell. However, the WTRU may need to know the SFN after handover for its normal operation in the target cell. Specifically, discontinuous reception (DRX) and reception of the dynamic broadcast channel (D-BCH) require the WTRU to have the knowledge of the SFN.

SUMMARY

A method and apparatus are disclosed for reducing handover time. This may include transmitting cell specific information in a handover command.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
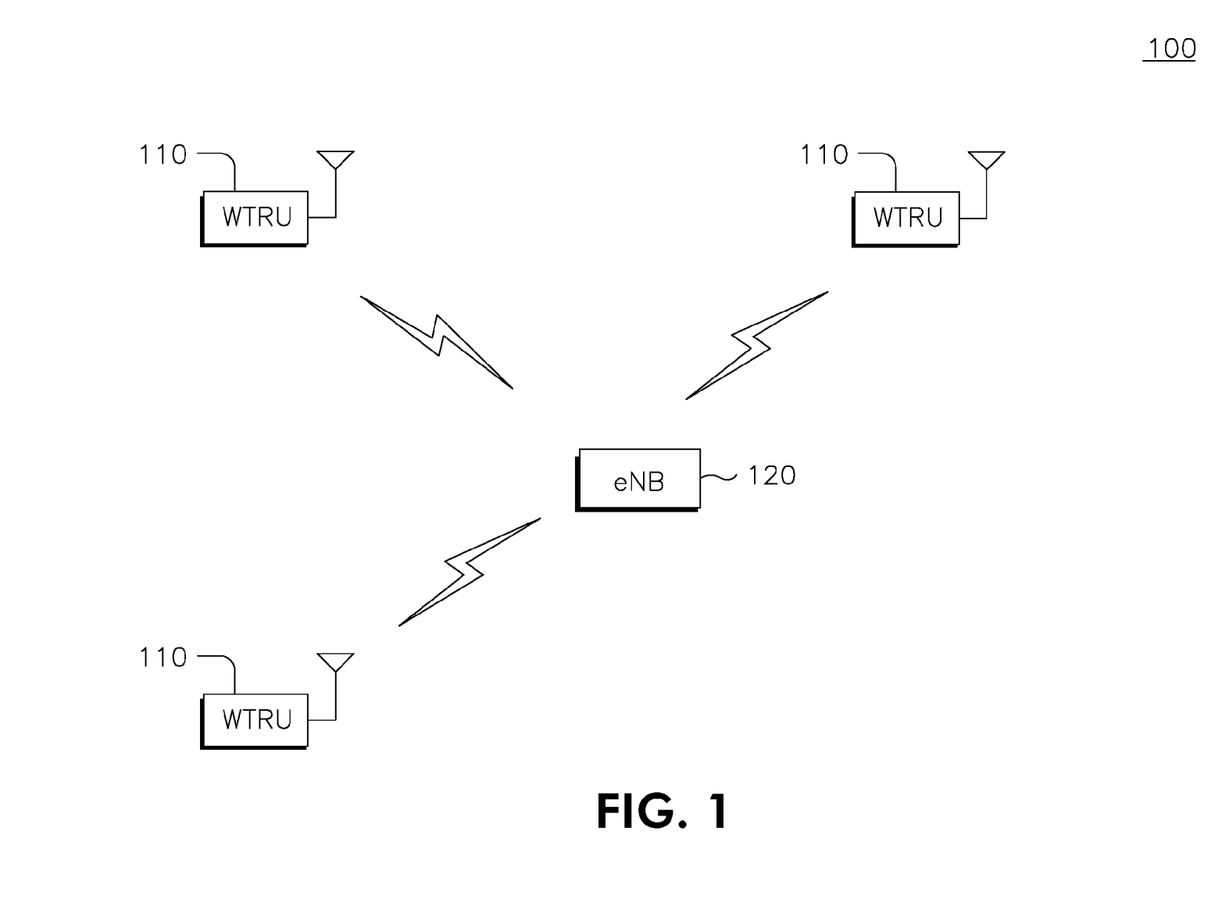
FIG. 1 shows an example wireless communication system including a plurality of WTRUs and an eNB in accordance with one claim.

FIG. 1 shows a wireless communication system 100 including a plurality of WTRUs 110 and an eNB 120. As shown in FIG. 1, the WTRUs 110 are in communication with the eNB 120. Although three WTRUs 110 and one eNB 120 are shown in FIG. 1, it should be noted that any combination of wireless and wired devices may be included in the wireless communication system 100.

Figure 2:
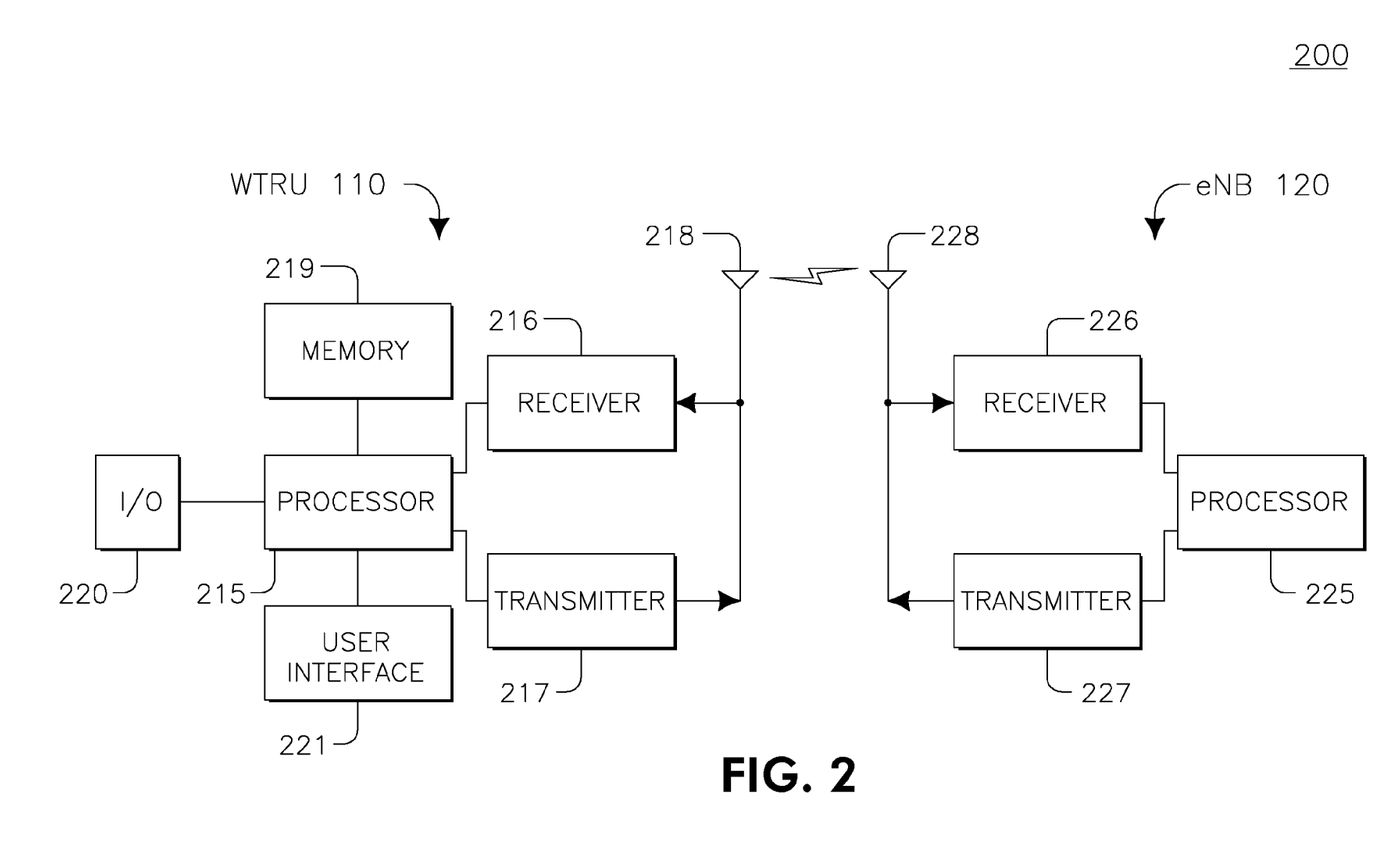
FIG. 2 is a functional block diagram of a WTRU and the eNB of FIG. 1 in accordance with one claim.

FIG. 2 is a functional block diagram 200 of a WTRU 110 and the base station 120 of the wireless communication system 100 of FIG. 1. As shown in FIG. 1, the WTRU 110 is in communication with the eNB 120. The WTRU 110 is configured to receive messages on downlink communication channels, such as a broadcast channel, for example. The eNB 120 may be configured to transmit, and the WTRU 110 configured to receive and monitor signals on the broadcast channel (BCH). The WTRU 110 may transmit on an uplink channel, such as a random access channel (RACH), for example. The WTRU 110 may be configured to transmit and receive radio resource control (RRC) messages and layer 1 (L1) messages.

In addition to the components that may be found in a typical WTRU, the WTRU 110 includes a processor 215, a receiver 216, a transmitter 217, and an antenna 218. The WTRU 110 may also include a user interface 221, which may include, but is not limited to, an LCD or LED screen, a touch screen, a keyboard, a stylus, or any other typical input/output device. The WTRU 110 may also include memory 219, both volatile and non-volatile, as well as interfaces 220 to other devices, such as universal serial bus (USB) ports, serial ports and the like. The receiver 216 and the transmitter 217 are in communication with the processor 215. The antenna 218 is in communication with both the receiver 216 and the transmitter 217 to facilitate the transmission and reception of wireless data.

In addition to the components that may be found in a typical eNB, the eNB 120 includes a processor 225, a receiver 226, a transmitter 227, and an antenna 228. The receiver 226 and the transmitter 227 are in communication with the processor 225. The antenna 228 is in communication with both the receiver 226 and the transmitter 227 to facilitate the transmission and reception of wireless data.

Handover interruption time is defined as the difference between the time the WTRU receives a handover command and the time the WTRU completes radio resource control (RRC) reconfiguration with the target cell, that is, when the WTRU resumes data transmission and reception in the target cell. In order for the WTRU to perform normal operation, such as data transmission and discontinuous reception (DRX), for example, in the target cell, the WTRU may acquire cell-specific system information carried on the P-BCH and the D-BCH of the target cell. However, reading the P-BCH, with a transmission time interval (TTI) of 40 ms repeated 4 times, and the D-BCH, with scheduling units of 80, 160 and 320 ms, may increase the handover interruption time.

The format of the signals received by the WTRU during a handover process may assist in reducing handover interruption time. Cell specific system information for the target cell, commonly carried on the P-BCH and the D-BCH, may be transmitted to a WTRU in other downlink signals that are part of the handover process. This may avoid handover interruption.

The target cell specific information received by a WTRU during the handover process may include:
  a. downlink system bandwidth;
  b. Physical Control Format Indicator Channel (PCFICH) information;
  c. Physical Hybrid ARQ Indicator Channel (PHICH) information, such as PHICH duration and PHICH resource size;
  d. signaling of reference-signal transmit power and power scaling of reference signal to other data/control sub-carriers;
  e. Random Access Channel (RACH) configuration:
    i. information regarding a dedicated preamble reserved for the handover WTRU in the target cell; and
    ii. a validity timer for the dedicated preamble for both synchronous and asynchronous networks;
  f. contention-based RACH information (optional);
  g. information for uplink reference signals (frequency hopping);
  h. information for sounding reference signals (location);
  i. Physical Uplink Control Channel (PUCCH) reference signal (RS) sequence hopping;
  j. Physical Uplink Shared Channel (PUSCH) hopping, that is, semi-static configuration of two hopping modes (inter and intra-sub-frame or inter-sub-frame) on a cell specific basis;
  k. uplink power control parameters;
  l. DRX related parameters in target cell;
  m. Start time of new DRX cycle in target cell;
  n. system frame number (SFN);
  o. Full SFN of the target cell;
  p. SFN difference between the source and target cells;
  q. Number of transmit antennas at the eNB that may have been blindly detected by the WTRU during cell search;
  r. Multiple Broadcast/Multicast Service (MBMS) single frequency number (MBSFN)-related parameters; and
  s. a neighboring cell list.

The information may be provided by the target cell to the source cell in a Handover Request Acknowledge message. The WTRU may obtain this information in downlink signals from the source eNB.

Alternatively, the network or eNB can define the handover parameters with one or more set of "default" values for intra-Evolved Universal Terrestrial Radio Access (E-UTRA) handover. In the handover, the target cell eNB can determine which of the set of values can be used by the WTRU for handover and send an index of the set of handover parameter values without the actual values. This may result in compact signalling.

Also, a special system information block (SIB) format can be defined for predefined handover parameter values, including the properties set forth above. The values may be related to a particular public land mobile network (PLMN). The network/service provider may predefine the necessary handover values, which may be in one or more sets of values, for the WTRU to acquire before the handover. The PLMN may be carried on eNBs broadcasting the SIB. The handover command may pass the index, one in a set, to the WTRU, for the handover parameters to the target cell.

The WTRU may indicate or report its acquisition of the handover parameters or an SIB that includes the handover parameters to the network in an uplink message, such as an RRC_reconfiguration_complete message or a RRC_measurement_report message. The confirmation of acquisition may be a single bit in the message, for example.

The network may determine which way the handover parameter values are transmitted to the WTRU in the handover command. A complete set of values may be used, or an index to the default value set may be used. Alternatively, an index to a set of the predefined value sets may be transmitted in the SIB broadcast by the eNB.

Figure 3:
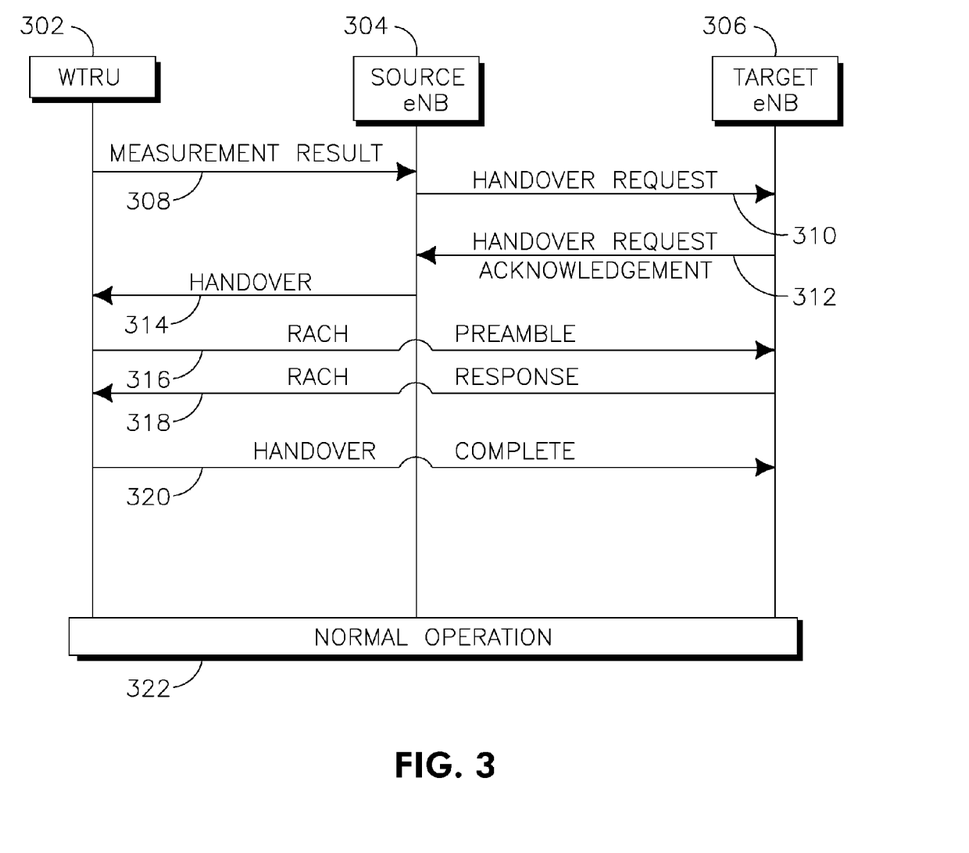
FIG. 3 shows a signal diagram of a handover in accordance with one claim.

FIG. 3 shows a signal diagram of a handover 300 in accordance with one claim. A WTRU 302 sends a measurement result result 308 to the source eNB 304. Based on the measurement, the source eNB 304 sends a handover request 310 to a target eNB 306. The target eNB 306 returns a handover request acknowledge message 312 to the source eNB 304. The handover request acknowledge message 312 includes the specific information of the target eNB 306, as set forth above.

The handover process 300 continues with the source eNB 304 sending a handover command 314 which carries the target cell specific information to the WTRU 302. The WTRU 302 communicates directly with the target eNB 306 by exchanging a RACH preamble 316, a RACH response 318 and a handover complete command 320. Normal operation 322 can then occur between the WTRU 302 and the target eNB 306.

Figure 4:
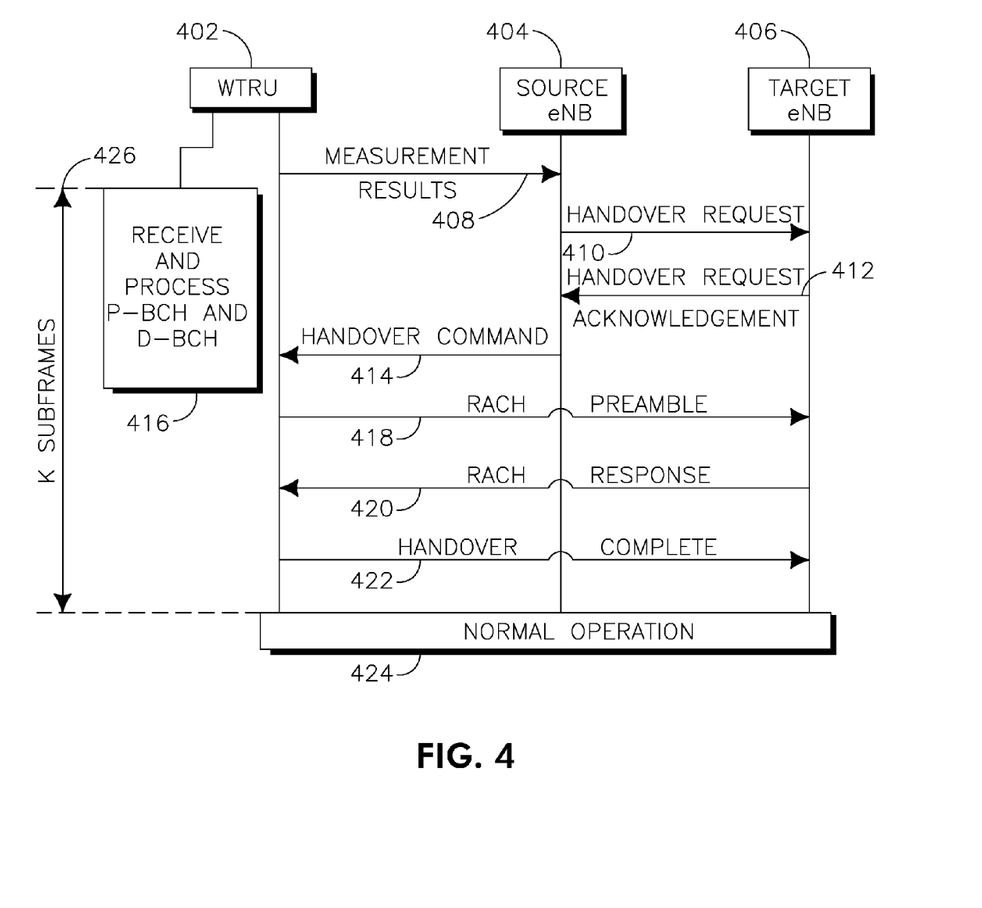
FIG. 4 shows a signal diagram of handover process in accordance with another claim.

FIG. 4 shows a signal diagram of handover process 400 in accordance with another claim. Similar to the process 300 of FIG. 3, a WTRU 402 sends a measurement result 408 to the source eNB 404. Based on the measurement, the source eNB 404 sends a handover request 410 to a target eNB 406. The target eNB 406 returns a handover request acknowledge message 412 to the source eNB 404. The handover request acknowledge message 412 includes the specific information of the target eNB 406, as set forth above.

The WTRU may now begin to receive and process signals on the P-BCH and the D-BCH 416. The reception and processing of P-BCH and D-BCH signals 416 may start before the WTRU transmits a RACH preamble 418. The physical resources used by the WTRU for P-BCH and the D-BCH reception 416 are different than those a WTRU may used to receive an eNB message, such as a RACH response 420. Therefore the WTRU 402 can receive and process the P-BCH and D-BCH 416 and RACH messages (not shown) simultaneously. The WTRU 402 sends the target eNB 406 a handover complete message.

The target eNB 406 may conclude that the WTRU 402 has acquired the target eNB SFN, a P-BCH and a D-BCH after K sub-frames 426. K is equal to M+N, where M is a number of P-BCH TTIs and N is a number of D-BCH periods. For example, M=4 corresponds to 160 ms after the first RACH dedicated preamble is received by the target eNB 406 from the WTRU 402 and equals the time for normal operations to start for the WTRU 402 after the handover command 414 is received by the WTRU 402.

It is possible for the period of time for the WTRU 402 to acquire the target eNB SFN to be less than the P-BCH and D-BCH information periods (K sub-frames). However, until K sub-frames have been received by the WTRU 402, normal operations 424 cannot be started by the eNB 406 for the WTRU 402, even though the WTRU 402 has acquired the SFN. These normal operations 424 include, but may not be limited to:
 a. DRX cycle;
 b. Layer 1 (L1) feedback;
 c. Dynamic and semi-persistent data transmission/reception; and
 d. Timing alignment.

If the WTRU acquires the target eNB SFN prior to K subframes, a default mode of operation may be applied in the target eNB 406 until the WTRU 402 acquires the SFN and/or BCH information. For example DRX operation may be disabled, and L1 feedback may not be generated or ignored. The WTRU 402 may provide implicit or explicit signaling to inform the target eNB 406 that the SFN and/or BCH information has been acquired, and that normal operation may resume.

Alternatively, if the WTRU 402 fails to receive the target eNB SFN and P-BCH, and fails to detect P-BCH timing successfully after the K sub-frames 426, then the WTRU 402 may determine that a radio link failure has occurred. The WTRU 402 may then start a radio link recovery process (not shown).

Figure 5:
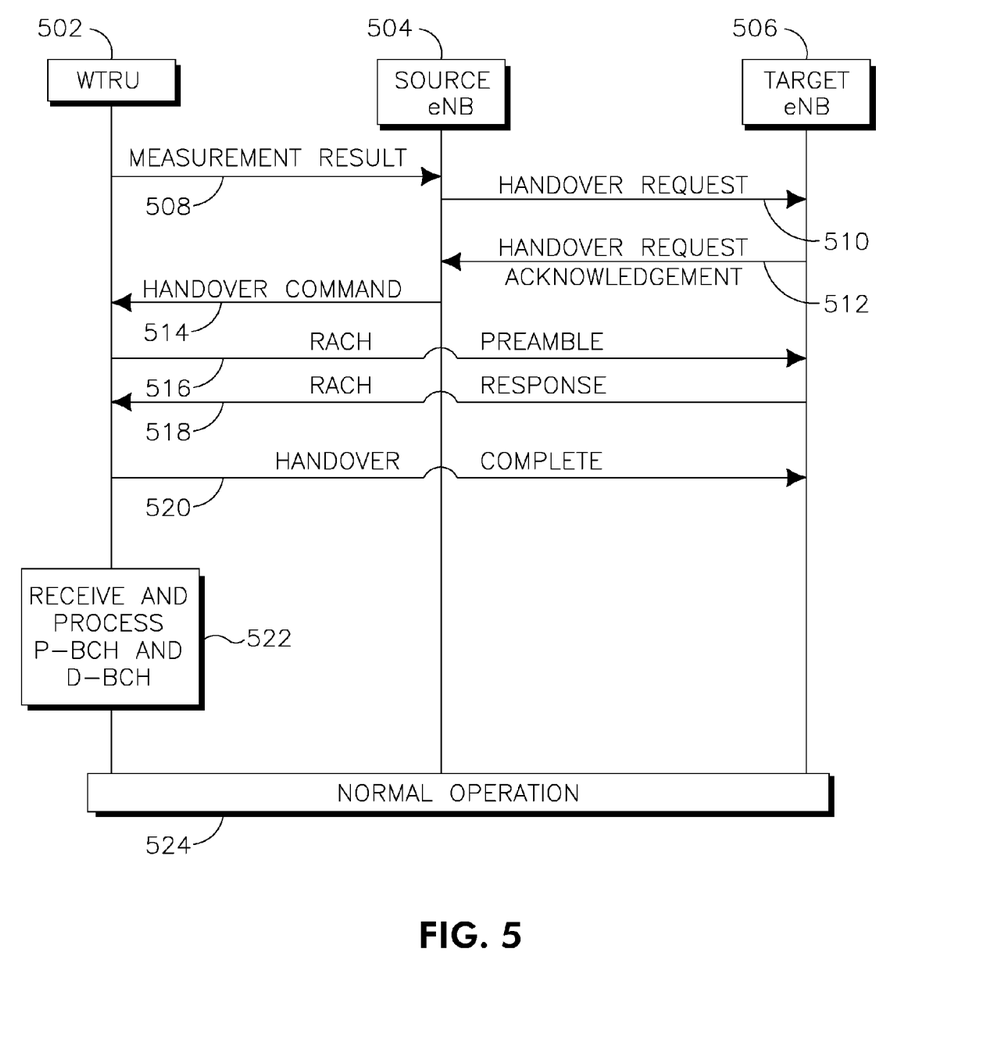
FIG. 5 shows a signal diagram of handover process in accordance with an alternative claim.

FIG. 5 shows a signal diagram of handover process 500 in accordance with an alternative claim. Similar to the process 300 of FIG. 3 and 400 of FIG. 4, a WTRU 502 sends a measurement result 508 to the source eNB 504. Based on the measurement, the source eNB 504 sends a handover request 510 to a target eNB 506. The target eNB 506 returns a handover request acknowledge message 512 to the source eNB 504. The handover request acknowledge message 512 includes the specific information of the target eNB 506, as set forth above.

The WTRU 502 sends a RACH preamble 516 to the target eNB 506. The target eNB 506 sends the RACH response message 518. The WTRU 502 then sends the handover complete message 520 to the target eNB 524. The WTRU 502 may now begin to receive and process signals on the P-BCH and the D-BCH 522. The reception of P-BCH and D-BCH signals 522 starts after the WTRU 502 transmits the handover complete 520 message. Once the WTRU 502 has acquired the P-BCH and the D-BCH signals 522, the WTRU 502 may resume normal operation 524.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method of handover in a wireless transmit/receive unit (WTRU), the method comprising:
 receiving a handover signal from a second evolved Node B (eNB) associated with a source cell, the handover signal including specific configuration except for a system frame number (SFN), of a first evolved Node B (eNB) associated with a target cell;
 initiating reception and processing of a primary broadcast channel (P-BCH) of the first eNB after receiving the handover command;
 implementing the configuration, at least in part, to the extent the SFN of the first eNB is not required, including deactivating layer 1 (L1) feedback;
 receiving the SFN of the first eNB; and
 further implementing the configuration utilizing the SFN of the first eNB, including activating L1 feedback.

2. The method of claim 1 wherein the configuration that is implemented to the extent the SFN of the first eNB is not required is, at least in part, a default configuration.

3. The method of claim 1, further comprising:
 sending a random access preamble to the first eNB;
 receiving a random access response from the first eNB; and
 sending a handover complete message to the first eNB.

4. A wireless transmit/receive unit (WTRU), comprising:
 a receiver configured to:
  receive a handover signal from a second evolved Node B (eNB) associated with a source cell, the handover signal including configuration information except for a system frame number (SFN), of a first evolved Node B (eNB) associated with a target cell; and
 at least one processor configured to:
  implement the configuration, at least in part, to the extent the SFN of the first eNB is not required, including deactivating discontinuous reception (DRX); and
  initiate reception and processing of a primary broadcast channel (P-BCH) of the first eNB after receiving the handover command, the receiver being further configured to receive the SFN of the first eNB, and the at least one processor also configured to further implement the configuration utilizing the SFN of the first eNB, including activating DRX.

5. The WTRU of claim 4 wherein the configuration that is implemented to the extent the SFN of the first eNB is not required is, at least in part, a default configuration.

6. The WTRU of claim 4, wherein the receiver is further configured to:
   receive a random access response from the first eNB, and the at least one processor is further configured to:
   initiate the sending of a random access preamble to the first eNB; and
   initiate the sending of a handover complete message to the first eNB.

7. A method of handover in a wireless transmit/receive unit (WTRU), the method comprising:
   receiving a handover signal from a second evolved Node B (eNB) associated with a source cell, the handover signal including specific configuration except for a system frame number (SFN), of a first evolved Node B (eNB) associated with a target cell;
   initiating reception and processing of a primary broadcast channel (P-BCH) of the first eNB after receiving the handover command;
   implementing the configuration, at least in part, to the extent the SFN of the first eNB is not required, including deactivating discontinuous reception (DRX);
   receiving the SFN of the first eNB; and
   implementing the configuration utilizing the SFN of the first eNB, including activating DRX.

8. The method of claim 7, wherein the configuration that is implemented to the extent the SFN of the first eNB is not required is, at least in part, a default configuration.

9. The method of claim 7, further comprising:
   sending a random access preamble to the first eNB;
   receiving a random access response from the first eNB; and
   sending a handover complete message to the first eNB.

10. A wireless transmit/receive unit (WTRU), comprising:
    a receiver configured to:
    receive a handover signal from a second evolved Node B (eNB) associated with a source cell, the handover signal including configuration information except for a system frame number (SFN), of a first evolved Node B (eNB) associated with a target cell; and
    at least one processor configured to:
    implement the configuration, at least in part, to the extent the SFN of the first eNB is not required, including deactivating layer 1 (L1) feedback; and
    initiate reception and processing of a primary broadcast channel (P-BCH) of the first eNB after receiving the handover command, the receiver being further configured to receive the SFN of the first eNB, and the at least one processor also configured to further implement the configuration utilizing the SFN of the first eNB, including activating L1 feedback.

11. The WTRU of claim 10, wherein the configuration that is implemented to the extent the SFN of the first eNB is not required is, at least in part, a default configuration.

12. The WTRU of claim 10, wherein the receiver is further configured to:
    receive a random access response from the first eNB, and the at least one processor is further configured to:
    initiate the sending of a random access preamble to the first eNB; and
    initiate the sending of a handover complete message to the first eNB.

* * * * *